US012060705B2

(12) United States Patent
Jiang

(10) Patent No.: US 12,060,705 B2
(45) Date of Patent: Aug. 13, 2024

(54) BODY CLEANER

(71) Applicant: Xiamen Soothingware Sanitary Co., Ltd., Fujian (CN)

(72) Inventor: Jianbing Jiang, Fujian (CN)

(73) Assignee: Xiamen Soothingware Sanitary Co., Ltd., Fujian (CN)

( * ) Notice: Subject to any disclaimer, the term of this patent is extended or adjusted under 35 U.S.C. 154(b) by 0 days.

(21) Appl. No.: 17/971,645

(22) Filed: Oct. 24, 2022

(65) Prior Publication Data

US 2023/0295911 A1 Sep. 21, 2023

(30) Foreign Application Priority Data

Mar. 15, 2022 (CN) ........................ 202220562678.9

(51) Int. Cl.
*E03D 9/08* (2006.01)
*B05B 1/30* (2006.01)

(52) U.S. Cl.
CPC . *E03D 9/08* (2013.01); *B05B 1/30* (2013.01)

(58) Field of Classification Search
CPC .................................. E03D 9/08; B05B 1/30
USPC ........................................................ 4/420.4
See application file for complete search history.

(56) References Cited

U.S. PATENT DOCUMENTS

| | | | | |
|---|---|---|---|---|
| 7,904,973 | B2 * | 3/2011 | Lian | E03D 9/08 4/420.4 |
| 8,296,872 | B2 * | 10/2012 | Yao | E03D 9/08 4/420.4 |
| 2020/0318335 | A1 * | 10/2020 | Gupta | E03C 1/12 |
| 2022/0098845 | A1 * | 3/2022 | Gupta | E03D 5/105 |

* cited by examiner

*Primary Examiner* — Huyen D Le
(74) *Attorney, Agent, or Firm* — Cooper Legal Group, LLC

(57) ABSTRACT

A body cleanser is provided. The casing has a switch valve installation position and a spray head installation position for installation of the switch valve and the spray head respectively. A plurality of waterway channels is provided inside the casing and arranged between the switch valve installation position and the spray head installation position. Starting ends of the waterway channels are provided with through holes communicated with water outlet holes of the switch valve. The starting ends of the two waterway channels with a maximum straight-line distance are on a first plane. The starting end of the remaining waterway channel (s) is connected with the corresponding water outlet hole through a respective communication member, so as being located between the starting ends of the two waterway channels with the maximum straight-line distance. The plane where the starting end of the remaining waterway channel is located is parallel to the first plane.

8 Claims, 5 Drawing Sheets

BODY CLEANER

FIELD OF THE INVENTION

The present invention relates to the technical field of sanitary products, and more particularly to a body cleaner.

BACKGROUND OF THE INVENTION

With the development of science and technology, people's requirements for automation are getting higher and higher in the field of bathroom, so body cleaners are widely used. The body cleaner has the function of cleaning the defecation part of the lower body of the human body, and can be used as a toilet seat ring and is used in conjunction with the toilet. The technology of body cleaners is becoming more and more mature. In order to improve the function and use of body cleaners, the conventional body cleaners generally include a casing, a switch assembly and a waterway inside the casing. The waterway inside the casing corresponds to the three waterways of self-cleaning, butt-washing and women's washing three water circuits. The switch assembly is used to switch the waterways inside the casting.

However, the conventional body cleaners have the following problems. The three waterways of the conventional body cleaners are arranged side by side on the same plane from the side adjacent to the switch assembly, which results in the cross-sectional area of the end connected to the switch assembly is relatively large and less beautiful. Some body cleaners reduce the cross-sectional area of the starting end of each waterway for aesthetics, so that the cross-sectional area of the end connected to the switch assembly is smaller. However, the starting end of each waterway is narrow, which is not conducive to the water outlet.

SUMMARY OF THE INVENTION

Therefore, the present invention provides a body cleaner to solve the above-mentioned technical problems.

The present invention adopts the following technical solutions.

A body cleanser, comprising a casing, a switch valve and a spray head, wherein the casing has a switch valve installation position and a spray head installation position for installation of the switch valve and the spray head respectively, a plurality of waterway channels are provided inside the casing, the waterway channels are arranged between the switch valve installation position and the spray head installation position, starting ends of the waterway channels are provided with through holes communicated with water outlet holes of the switch valve, the starting ends of the two waterway channels with a maximum straight-line distance are on a first plane, the starting end of the remaining waterway channel(s) is connected with the corresponding water outlet hole through a respective communication member, so that the starting end of the remaining waterway channel is located between the starting ends of the two waterway channels with the maximum straight-line distance, and a plane where the starting end of the remaining waterway channel is located is parallel to the first plane.

In an embodiment of the present invention, based on the consideration of cost optimization and assembling convenience, the communication member is a tubular structure with a passthrough hole.

In an embodiment of the present invention, in order to ensure that the starting ends of the waterway channels are misaligned distribution, the lengths of the communication members are different.

In an embodiment of the present invention, there are three waterway channels, the three waterway channels are a first waterway channel, a second waterway channel and a third waterway channel, the two waterway channels with the maximum straight-line distance are the first waterway channel and the second waterway channel, the starting ends of the first waterway channel and the second waterway channel are on the first plane, the starting end of the third waterway channel is connected with the corresponding water outlet hole through the communication member, so that the starting end of the third waterway channel is located between the starting end of the first waterway channel and the starting end of the second waterway channel, and a plane where the starting end of the third waterway channel is located is parallel to the first plane.

In an embodiment of the present invention, in order to ensure that the cross-sectional area of the starting end of the waterway channel is large enough, a pipe wall is shared between the first waterway channel and the second waterway channel, and a starting section of the pipe wall is approximately an inverted "S" shape.

In an embodiment of the present invention, based on the consideration of cost optimization and assembling convenience, the through hole of the third waterway channel and the corresponding water outlet hole are on a same straight line, and the communication member directly communicates and connects the through hole of the third waterway channel and the corresponding water outlet hole.

In an embodiment of the present invention, for the purpose of reducing the overall volume of the body cleaner, the three waterway channels correspond to self-washing, women's washing and butt-washing gears respectively, the spray head installation positions of the women's washing gear and the butt-washing gear are on a first straight line, the spray head installation position of the self-washing gear is on a second straight line parallel to the first straight line and is located between the spray head installation positions of the women's washing gear and the butt-washing gear.

In an embodiment of the present invention, in order to facilitate the installation of the body cleaner on the toilet, the casing is provided with two mounting rings on a side of the spray head installation position, and the casing is mounted on a toilet through the mounting rings.

After adopting the above solutions, the present invention has the following beneficial effects: a plurality of waterway channels can be arranged in the casing, and the cross-sectional area of the starting end of each waterway channel can be ensured to be large enough to avoid the occurrence of the starting ends of the waterway channels being on the same plane, resulting in the area of the starting ends of the waterway channels needs to be correspondingly reduced in a limited space, which is not conducive to the water outlet.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
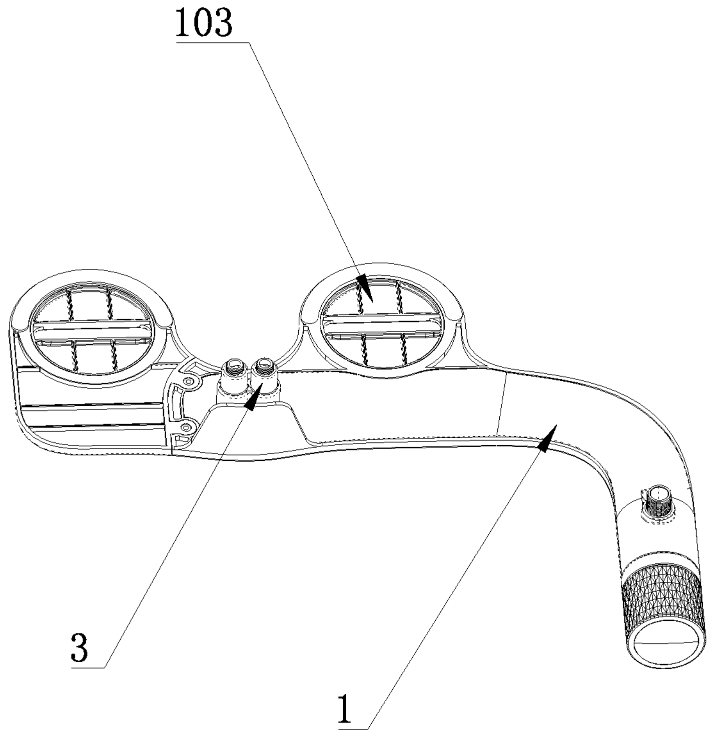
FIG. 1 is a schematic view of the structure of the embodiment of the present invention.
Figure 2:
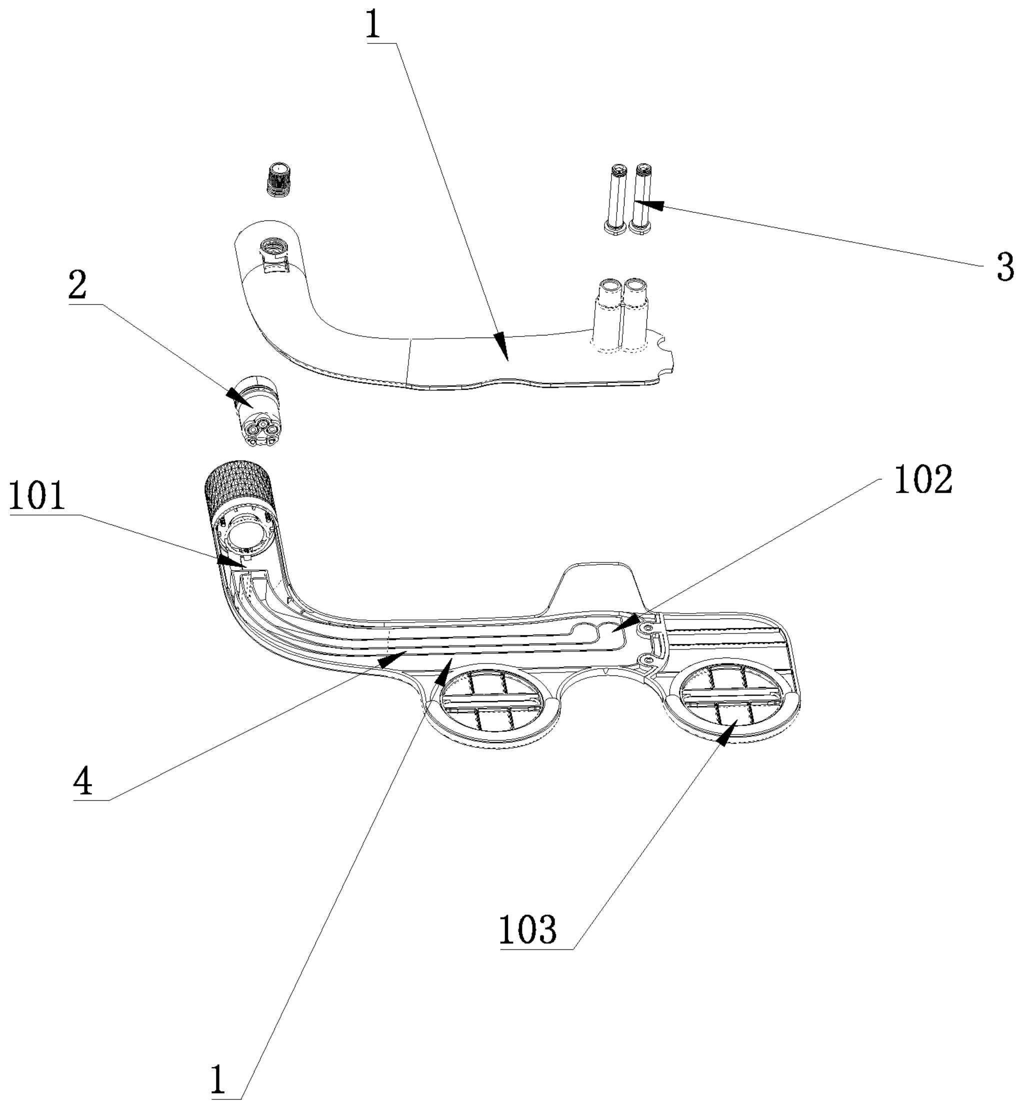
FIG. 2 is a front exploded view of the embodiment of the present invention.
Figure 3:
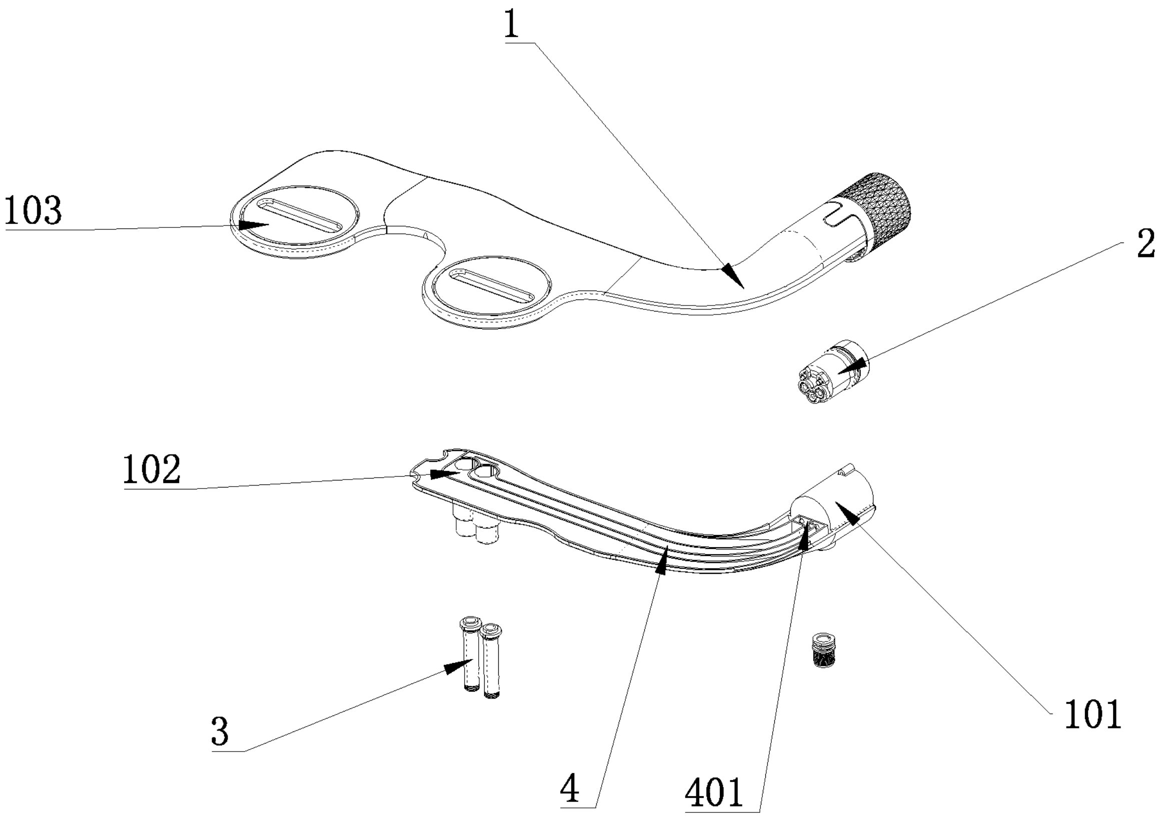
FIG. 3 is a reverse exploded view of the embodiment of the present invention.

The present invention provides a body cleaner as shown in FIGS. 1 to 5. In a preferred embodiment of the present invention as shown in FIGS. 1 to 3, the body cleaner includes a casing 1, a switch valve 2 and a spray head 3. The casing 1 has a switch valve installation position 101 and a spray head installation position 102. The switch valve installation position 101 is for installation of the switch valve 2. The spray head installation position 102 is for installation of the spray head 3. The switch valve installation position 101 and the spray head installation position 102 are arranged on two sides of the casing 1. A plurality of waterway channels 4 are provided inside the casing 1. The waterway channels 4 are arranged between the switch valve installation position 101 and the spray head installation position 102. The starting ends 401 of the waterway channels 4 are arranged on the side of the switch valve installation position 101. The starting ends 401 of the waterway channels 4 are provided with through holes communicated with the water outlet holes of the switch valve 2, respectively. The starting ends 401 of the two waterway channels 4 with the maximum straight-line distance are on the first plane, and the starting end 401 of the remaining waterway channel(s) 4 is connected with the corresponding water outlet hole through a communication member 5, so that the starting end of the remaining waterway channel 4 is located between the starting ends of the two waterway channels 4 with the maximum straight-line distance, and the plane where the starting end of the remaining waterway channel 4 is located is parallel to the first plane. In this way, the starting ends of the two waterway channels 4 with the maximum straight-line distance are on the same plane, and the starting end of the remaining waterway channel 4 is located between the starting ends of the two waterway channels 4 with the maximum straight-line distance through the communication member 5 and therefore the starting ends are misaligned distribution, so as to avoid the starting ends of all the waterway channels 4 being on the same plane, resulting in a greater length on the side of the switch valve installation position 101 of the body cleaner, a larger cross-sectional area, less beautiful, or resulting in a problem that the size of the starting end of each waterway channel 4 needs to be limited due to the limited size of the body cleaner, which is not conducive to the water outlet.

Figure 5:
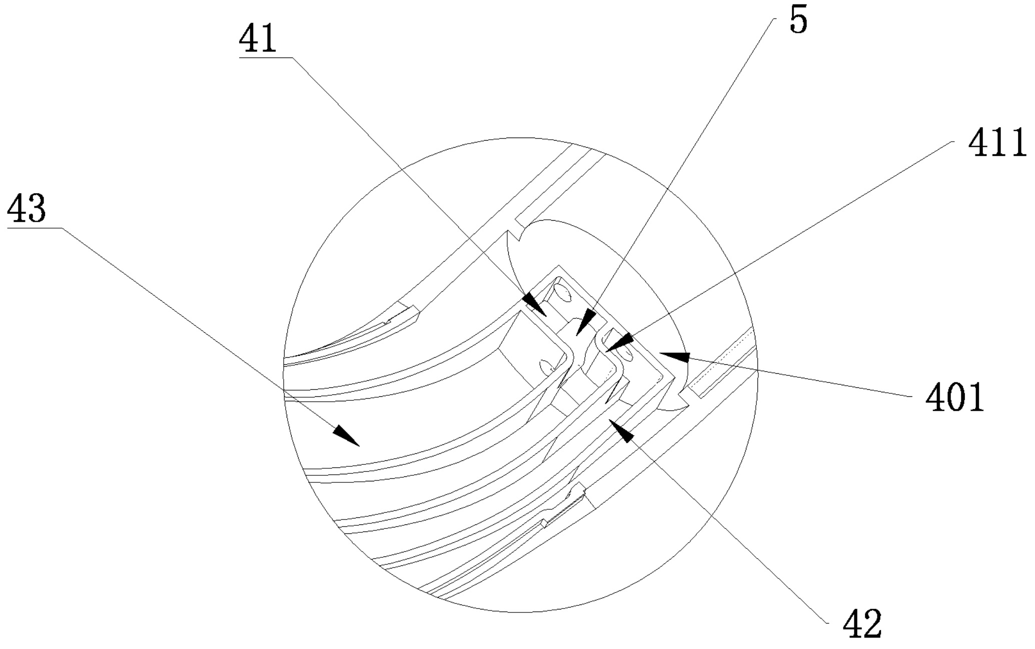
FIG. 5 is a partial enlarged view of FIG. 4.

Refer to FIG. 5. The communication member 5 is a tubular structure with a passthrough hole, so as to facilitate the sealing connection of the communication member 5 with the waterway channel 4 and the switch valve 2. When there are more than three waterway channels 4 in the body cleaner, a plurality of communication members 5 need to be arranged to realize the connection between the remaining waterway channels 4 and the water outlet holes of the switch valve 2. The lengths of the communication members 5 are different, so that the starting ends of the waterway channels 4 are placed on different planes, so as to ensure the smooth water outlet of each waterway channel 4.

Figure 4:
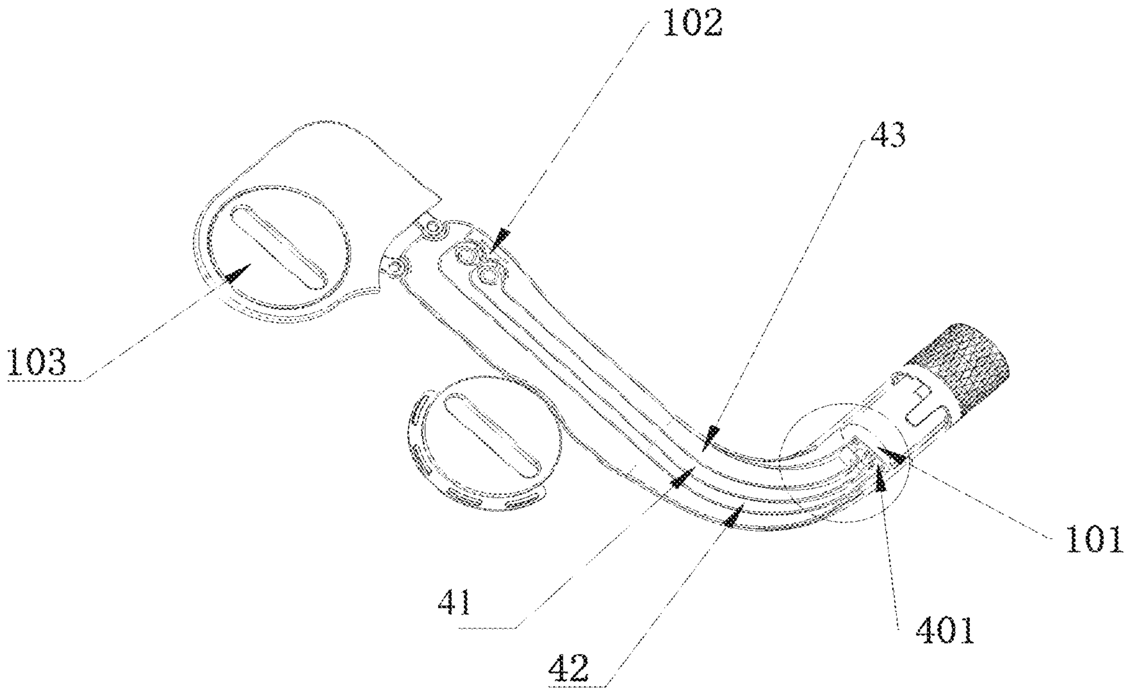
FIG. 4 is a schematic view of the structure of the embodiment of the present invention, wherein part of the casing is hidden.

In this embodiment, three waterway channels 4 are arranged in the body cleaner as an example for description. Referring to FIGS. 3 to 5, the three waterway channels 4 are the first waterway channel 41, the second waterway channel 42 and the third waterway channel 43. It is defined that the two waterway channels with the maximum straight-line distance as the first waterway channel 41 and the second waterway channel 42. The starting ends of the first waterway channel 41 and the second waterway channel 42 are on the first plane, and the starting end of the third waterway channel 43 is connected with the corresponding water outlet hole through the communication member 5, so that the starting end of the third waterway channel 43 is located between the starting end of the first waterway channel 41 and the starting end of the second waterway channel 42. The starting end of the third waterway channel 43 is on the second plane, and the second plane is parallel to the first plane.

Refer to FIG. 5. A pipe wall 411 is shared between the first waterway channel 41 and the second waterway channel 42. The starting section of the pipe wall 411 is approximately in an inverted "S" shape, that is, the starting section of the pipe wall 411 has two bent portions facing the first waterway channel 41 and the second waterway channel 42 respectively, so that the area of the starting ends of the first waterway channel 41 and the second waterway channel 42 is large enough to facilitate smooth water outlet. The through hole of the third waterway channel 43 and the corresponding water outlet hole are on the same straight line. Thus, by directly communicating and connecting the through hole of the third waterway channel 43 and the corresponding water outlet hole through the communication member 5, it is avoided excessive bending of the water flowing out from the water outlet hole of the switch valve 2, which is also conducive to smooth water outlet. In this embodiment, the third waterway channel 43 and the first waterway channel 41 share a sidewall to reduce the manufacturing cost. In addition, the shared sidewall can also reduce the space occupied by the pipe wall and maximize the area of the waterway channel.

In this embodiment, in order to reduce the overall volume of the body cleaner, the three waterway channels 4 correspond to the self-washing, women's washing and butt-washing gears respectively. Specifically, as shown in FIG. 4, the first waterway channel 41 corresponds to the women's washing gear, the second waterway channel 42 corresponds to the butt-washing gear, and the third waterway channel 43 corresponds to the self-washing gear. The spray head installation positions 102 of the women's washing gear and the butt-washing gear are on the first straight line. The spray head installation position 102 of the self-washing gear is on the second straight line parallel to the first straight line, and is located between the spray head installation positions 102 of the women's washing gear and the butt-washing gear, so that the spray head installation positions 102 of the three gears are distributed in the shape of top and twin-side bottom. The spray head of the self-washing gear is located between the spray heads of the women's washing gear and the butt-washing gear. The spray head of the self-washing gear is for cleaning the spray heads of the women's washing gear and the butt-washing gear. Different from the structure in which the spray head installation positions of the three gears in the prior art body cleaner are distributed on a straight line, the present invention makes the length of the spray head installation position 102 of the body cleaner and the overall volume of the body cleaner smaller. In order to facilitate the installation of the body cleaner on the toilet, the casing 1 is provided with two mounting rings 103 on the side of the spray head installation position 101. The casing 1 is installed with the toilet through the mounting rings 103. The mounting ring 103 can be a fixed adjusting disc, which is shrunk on the toilet through a locking member (e.g., a locking screw), so as to realize the installation of the body cleaner on the toilet.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A body cleanser, comprising a casing, a switch valve and a spray head, wherein the casing has a switch valve installation position and a spray head installation position for installation of the switch valve and the spray head respectively, a plurality of waterway channels are provided inside the casing, the waterway channels are arranged between the switch valve installation position and the spray head installation position, starting ends of the waterway channels are provided with through holes communicated with water outlet holes of the switch valve, the starting ends of the two waterway channels with a maximum straight-line distance are on a first plane, the starting end of the remaining waterway channel(s) is connected with the corresponding water outlet hole through a respective communication member, so that the starting end of the remaining waterway channel is located between the starting ends of the two waterway channels with the maximum straight-line distance, and a plane where the starting end of the remaining waterway channel is located is parallel to the first plane.

2. The body cleaner according to claim 1, wherein the communication member is a tubular structure with a pass-through hole.

3. The body cleaner according to claim 1, wherein lengths of the communication members are different.

4. The body cleaner according to claim 1, there are three waterway channels, the three waterway channels are a first waterway channel, a second waterway channel and a third waterway channel, the two waterway channels with the maximum straight-line distance are the first waterway channel and the second waterway channel, the starting ends of the first waterway channel and the second waterway channel are on the first plane, the starting end of the third waterway channel is connected with the corresponding water outlet hole through the communication member, so that the starting end of the third waterway channel is located between the starting end of the first waterway channel and the starting end of the second waterway channel, and a plane where the starting end of the third waterway channel is located is parallel to the first plane.

5. The body cleaner according to claim 4, wherein a pipe wall is shared between the first waterway channel and the second waterway channel, and a starting section of the pipe wall is approximately an inverted "S" shape.

6. The body cleaner according to claim 4, wherein the through hole of the third waterway channel and the corresponding water outlet hole are on a same straight line, and the communication member directly communicates and connects the through hole of the third waterway channel and the corresponding water outlet hole.

7. The body cleaner according to claim 4, the three waterway channels correspond to self-washing, women's washing and butt-washing gears respectively, the spray head installation positions of the women's washing gear and the butt-washing gear are on a first straight line, the spray head installation position of the self-washing gear is on a second straight line parallel to the first straight line and is located between the spray head installation positions of the women's washing gear and the butt-washing gear.

8. The body cleaner according to claim 1, wherein the casing is provided with two mounting rings on a side of the spray head installation position, and the casing is mounted on a toilet through the mounting rings.

* * * * *